United States Patent [19]

Tanaka et al.

[11] Patent Number: 4,465,342

[45] Date of Patent: Aug. 14, 1984

[54] ZOOM LENS

[75] Inventors: Kazuo Tanaka; Shigeyuki Suda, both of Tokyo, Japan

[73] Assignee: Canon Kabushiki Kaisha, Japan

[21] Appl. No.: 285,012

[22] Filed: Jul. 20, 1981

[30] Foreign Application Priority Data

Jul. 25, 1980 [JP] Japan .................. 55-102592

[51] Int. Cl.³ .................. G02B 13/18; G02B 15/14
[52] U.S. Cl. .................. 350/427; 350/432
[58] Field of Search ............ 350/423, 427, 432–435

[56] References Cited

U.S. PATENT DOCUMENTS 3,920,315 11/1975 Linke .................. 350/423
4,306,776 12/1981 Someya .................. 350/427

Primary Examiner—John K. Corbin
Assistant Examiner—Scott J. Sugarman
Attorney, Agent, or Firm—Toren, McGeady and Stanger

[57] ABSTRACT

A zoom lens comprising, from front to rear, a first lens component having a positive focal length, a second lens component having a negative focal length and a third group having a positive focal length, the first and second lens components being moved to effect zooming, and the first lens component being moved to effect focusing. The above-described first, second and third lens components are each provided with at least one aspheric lens. The first lens component has a negative third order aspheric quantity and the second lens component has a positive third order aspheric quantity to realize a zoom lens of high imaging performance with fewer constituent lens elements.

6 Claims, 22 Drawing Figures

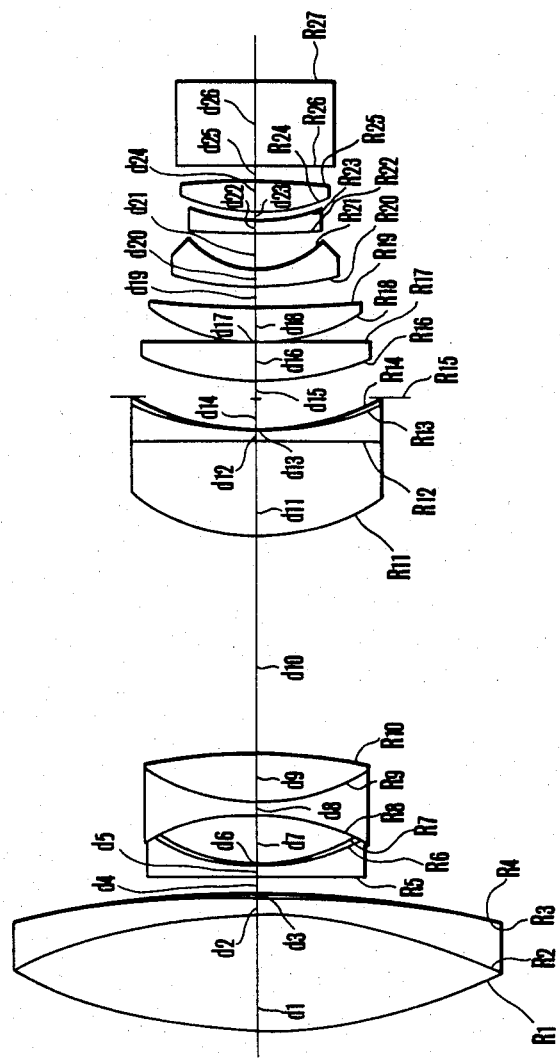

ZOOM LENS

BACKGROUND OF THE INVENTION

This invention relates to zoom lenses for use with television cameras and movie cameras, and more particularly to zoom lenses having a large relative aperture with a range covering focal lengths used frequently.

The conventional practice is disclosed in Japanese Patent Sho 40-665 and U.S. Pat. No. 3,994,571. Three constituent lens components have, from the front, positive, negative and positive powers. When zooming from the wide angle to the telephoto mode the 2nd lens component is moved axially forward to change the focal length of the entire system, while the 1st lens component is simultaneously moved reciprocatingly in a convex path toward the front to maintain the position of a focal plane. When focusing, the 1st lens component is axially moved. Such a zoom lens is capable of reduction in bulk and size. In recent camera art, however, as the body becomes progressively more compact, a further minimization of the bulk and size of the camera including the lens system is desired. When the 3-component zoom lens is to be shortened in the longitudinal direction, the air separations between the successive lens lens components may be narrowed, and the axial thickness of each of the lens components may be reduced. The desired equivalent zoom ratio is present, however, by increasing the refractive power of each lens component with the production of steeply increasing aberrations in each lens component. Particularly difficult to remove are the spherical aberrations in the telephoto position and the variation of distortion with zooming.

The reduction of the imaging performance resulting from the increase of the refractive power of each lens component can be prevented to some extent by increasing the number of constituent lens elements. But, this results in the alternate disadvantage that the thickness and weight of the constituent lens component itself are increased. Thus, it is impossible to minimize of the bulk and size of the lens system as a whole, and, because of the increase of weight of the movable lens components, to improve the ease of management.

As another means of reducing the variation of the aberrations in the zooming range, the prior art has introduced an aspheric surface into the zoom lens. U.S. Pat. No. 3,972,592, relating to a 3-component varifocal lens for projectors in which the second component is moved to effect a change of the image magnification, has the aspheric provision in the 2nd component to correct spherical aberration. Also in U.S. Pat. No. 3,920,315 there is shown a varifocal lens for projectors too, in which the lens components, movable for zooming on either side of one stationary lens component, are each provided with an aspheric surface to correct spherical aberration. Furthermore, in U.S. Pat. Nos. 4,153,339, 4,159,865 and 4,196,968 there are shown 2-component zoom lenses with the introduction of an aspheric surface to correct spherical aberration in the telephoto position and distortion in the wide angle position.

SUMMARY OF THE INVENTION

An object of the present invention is to achieve a minimization of the bulk and size of a zoom lens of the above-described 3-lens component construction.

Another object of the present invention is to provide a zoom lens with means rendering it possible to prevent deterioration of the aberrations which would otherwise result from the reduction of the size with the desired zoom ratio unchanged.

Still another object of the present invention is to provide a zoom lens of easily manageable proportion and amenable to low unit cost production techniques.

One of the features of a zoom lens, according to the present invention is that reducing the necessary number of lens elements constituting a lens component introduces an aspheric surface. This introduction of the aspheric surface makes it possible to prevent deterioration of the aberrations despite the reduction of the lens element number.

That is, the zoom lens of the invention comprises, from front to rear, a 1st lens component having a positive focal length, a 2nd group having a negative focal length and a 3rd lens component having a positive focal length. The 1st and 2nd lens components are moved to effect zooming, and the 1st lens component is moved to effect focusing. These lens components are each provided with at least one aspheric surface to accomplish all the above-mentioned objects.

Such provision of the aspheric surfaces in both the 1st and 2nd lens components has an advantage that the 1st and 2nd lens components can be constructed with a very small number of lens elements while nevertheless permitting good correction of the various aberrations which would otherwise be objectionably large in the 1st and 2nd lens components. Another advantage arising from the construction of the 1st lens component, which is usually movable for focusing, and the 2nd lens component, which is usually a variator in the more compact and lighter form, is that the weight and bulk of the complete lens can be kept within an easily manageable proportion.

in the wide angle, middle and telephoto positions respectively.

Figure 7A:
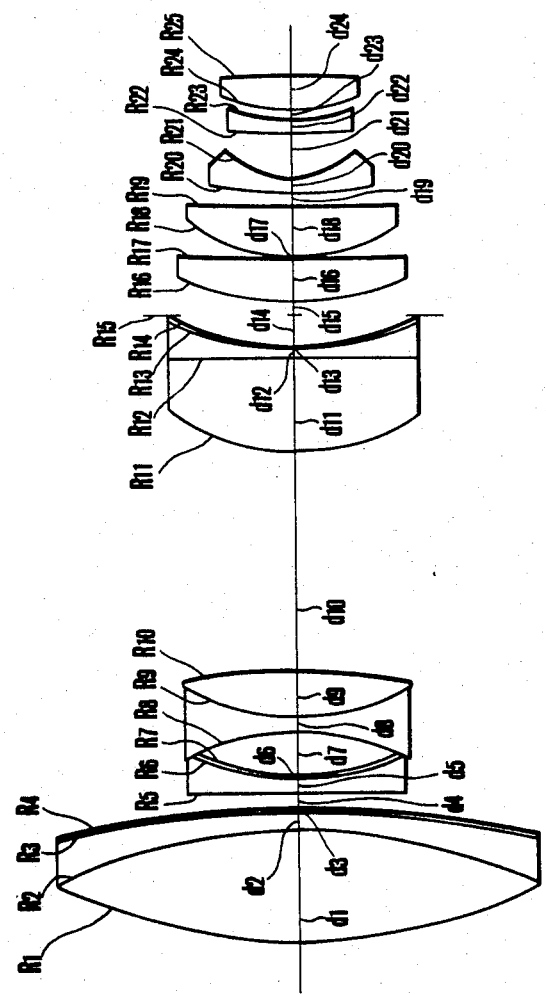

FIG. 7(A) is a longitudinal sectional view of a further embodiment of a zoom lens according to the present invention.

Figure 7B:
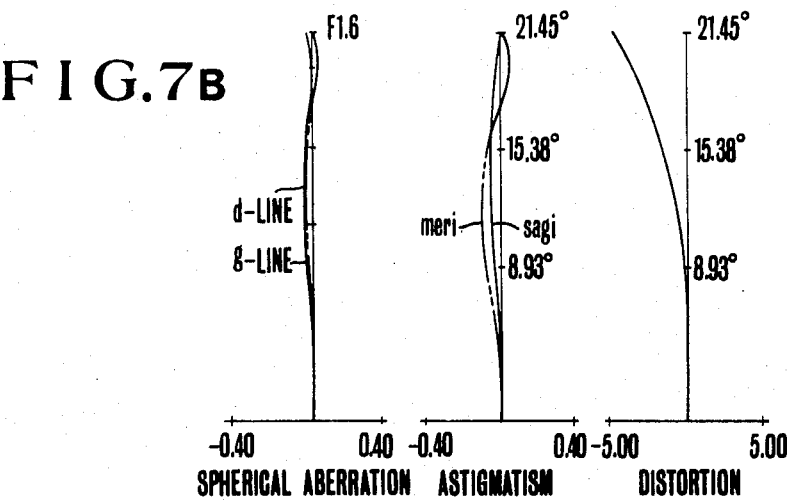

FIGS. 7(B), (C) and (D) are graphic representations of the various aberrations of the zoom lens of FIG. 7(A) in the wide angle, middle and telephoto positions respectively.

DESCRIPTION OF THE PREFERRED EMBODIMENTS

The zoom lens of the invention comprises, from front to rear, a 1st lens component having a positive focal length, a 2nd lens component having a negative focal length and a 3rd lens component having a positive focal length. Axially rearward movement of the 2nd lens component causes the focal length of the entire system to be varied from the shortest to the longest, while the 1st lens component is reciprocatingly moved in a convex path toward the front so that a fixed focal plane is maintained throughout the entire focal length range. To achieve a high standard of aberration correction, the 1st and 2nd lens components are each provided with at least one aspheric surface, and the following conditions are satisfied:

$$-0.093 < \Psi_1 < -0.069 \quad (I)$$

$$0.44 < \Psi_2 < 0.60 \quad (II)$$

$$2.9 < f_1/fw < 3.0 \quad (III)$$

$$-0.90 < f_2/fw < -0.85 \quad (IV)$$

$$1.1 < l/fw < 1.2 \quad (V)$$

where
- $\Psi_1$: the sum of the 3rd order coefficients of the aspheric surface in the 1st lens component;
- $\Psi_2$: the sum of the 3rd order coefficients of the aspheric surface in the 2nd lens component;
- fw: the shortest focal length of the entire system;
- $f_1$: the focal length of the 1st lens component;
- $f_2$: the focal length of the 2nd lens component; and
- l: the axial air separation between the 2nd and 3rd lens components when in the wide angle setting.

Conditions (I) and (II) are concerned with the configuration of the aspheric surfaces for which are defined various parameters below.

In general, an aspheric surface can be expressed by the following equation:

$$x = \left\{ 1 + \sqrt{1 - (A+1)\left(\frac{h}{r}\right)^2} \right\}^{-1} \left(\frac{h}{r}\right)^2 + Bh^4 + Ch^6 + Dh^8 + Eh^{10} \quad (1)$$

Figure 1:
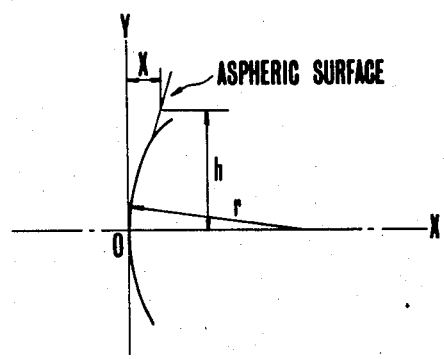
FIG. 1 is a graph considered to define an aspheric surface.

As shown in FIG. 1, the aspheric surface intersects an optical axis at which point the paraxial region has a radius of curvature, r; the x-abscissa is taken on the optical axis to be coincident with the direction in which light advances, and the y-ordinate is taken to be perpendicular thereto and to pass through the vertex 0 of the aspheric surface; and h is the height in the y-ordinate. This equation (1) is based on a surface of the 2nd order, and particularly when A=0, becomes an equation based on the spherical surface. And, A in the 1st term and B in the 2nd term are used in defining the 3rd order aspheric coefficient $\Psi$ as follows:

$$\Psi = (N'-N)\{8B + A(1/r)^3\}fw^3$$

where N' and N are the indices of refraction of the media on the image and object sides of the aspheric surface respectively; r is the radius of curvature of the paraxial region of the aspheric surface; and fw is the shortest focal length of the entire system.

Also A in the 1st term and C in the 3rd term are used in defining the 5th order aspheric coefficient $\Omega$ as follows:

$$\Omega = 3(N'-N)\{16C + (A^2+2A)(1/r)^5\}fw^5$$

In general, when the 1st lens component is constructed in the form of a positive lens component, and the 2nd component in the form of a negative lens component, the 3rd order aberration coefficients have the following features:

$$|I_1T| > |I_1w|; I_1 > 0$$

$$|II_1T| > |II_1w|; II_1 < 0$$

$$|III_1T| > |III_1w|; III_1 > 0$$

$$|V_1T| < |V_1w|; V_1 < 0$$

$$|I_2T| > |I_2w|; I_2 < 0$$

$$|II_2T| > |II_2w|; II_2 > 0$$

$$|III_2T| > |III_2w|; III_2 < 0$$

$$|V_2T| < |V_2w|; V_2 > 0$$

where I represents the 3rd order coefficient of spherical aberration, II that of coma, III that of astigmatism, V that of distortion; the suffix 1 represents the 1st lens component, 2 the 2nd lens component, w the wide angle setting, and T the telephoto setting.

Therefore, the entire system is corrected for the aberrations by balancing the 1st and 2nd lens components. But, as the power of each lens component is strengthened to reduce the size, it becomes difficult to correct the aberrations of the entire system.

Particularly with the lens system having an increased relative aperture and zoom ratio, the higher order aberrations become objectionably large so that it is very difficult to realise a zoom lens of high imaging performance.

Figure 2:
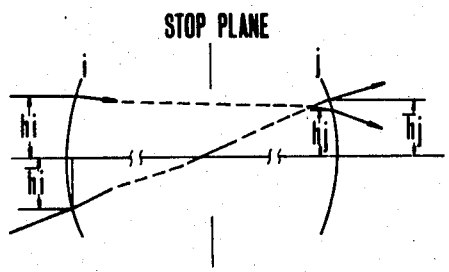
FIG. 2 is a diagram of geometry considered to define the paraxial quantities.

However, it is known that the introduction of the aspheric surfaces causes each of the aberrations to be changed as follows:

$$\Delta I = h^4 \Psi$$

$$\Delta II = h^3 \bar{h} \Psi$$

$$\Delta III = h^2 \bar{h}^2 \Psi$$

$$\Delta V = \bar{h} h^3 \Psi$$

where as shown in FIG. 2, h and OVE/h/ represent the heights of incidence of a paraxial ray of light and a paraxial pupil ray of light on the aspheric surface respectively, and when the 1st lens component is constructed in the form of a positive lens component and the 2nd lens component in the form of a negative lens component, these parameters have the following features:

$$|h_1T^4| > |h_1w^4|; h_1^4 > 0$$

$$|h_1T^3\overline{h_1}T| > |h_1w^3\overline{h_1}w|; h_1^3\overline{h_1} < 0$$

$$|h_1T^2\overline{h_1}T^2| > |h_1w^2\overline{h_1}w^2|; h_1^2\overline{h_1}^2 > 0$$

$$|h_1\overline{h_1}T^3| > |h_1w\overline{h_1}w^3|; h_1\overline{h_1}^3 < 0$$

$$|h_2T^4| > |h_2w^4|; h_2^4 > 0$$

$$|h_2T^3\overline{h_2}T| > |h_2w^3\overline{h_2}w|; h_2^3\overline{h_2} < 0$$

$$|h_2T^2\overline{h_2}T^2| < |h_2w^2\overline{h_2}w^2|; h_2^2\overline{h_2}^2 > 0$$

$$|h_2\overline{h_2}T^3| < |h_2w\overline{h_2}w^3|; h_2\overline{h_2}^3 < 0$$

Therefore, the application of negative and positive appropriate 3rd order aspheric quantities to the 1st and 2nd lens components respectively makes it possible to reduce all the 3rd order aberrations produced in the 1st and 2nd lens components, thus giving rise to large effects on suppression of the variation with zooming of spherical aberration, coma and astigmatism particularly in the 1st lens component, and of aspherical aberration coma and distortion particularly in the 2nd lens component.

Condition (I) is concerned with the aspheric quantity of the 1st lens component. When this lower limit is exceeded, pincushion type distortion is increased in the telephoto position. When the upper limit is exceeded, the spherical aberration in the telephoto position is not fully corrected or under-corrected. Condition (II) is concerned with the aspheric quantity of the 2nd lens component. When the lower limit is exceeded, barrel type distortion in not fully corrected in the wide angle position. When the upper limit is exceeded, the spherical aberration is under-corrected in the telephoto position despite the fact that it has the negative focal length, thereby making it difficult to balance the whole. Conditions (III), (IV) and (V) are concerned with the reduction of the size of the entire system and the zoom ratio. Condition (III) represents the focal length of the 1st lens component. When the upper limit is exceeded, the entire system is increased in size. When the lower limit is exceeded, it becomes difficult to correct spherical aberration in the telephoto position when the aberration of the whole is balanced. (IV) represents the focal length of the 2nd lens component. When the upper limit is exceeded, an increase in the size of the entire system is also called for. When the lower limit is exceeded, it becomes difficult to correct the barrel type distortion in the wide angle position and the spherical aberration in the telephoto position. Condition (V) is also concerned with the reduction of the size of the entire system. When the upper limit is exceeded, an increase in the size of the entire system is called for. When the lower limit is exceeded, it becomes difficult to obtain a sufficient zoom ratio. There are shown below embodiments of the invention where the 1st and 2nd lens components make use of the aspheric surfaces. The 1st lens component is constructed in the form of one cemented lens member, and the 2nd lens component in the form of two members containing at least one cemented surface with and advantage that the size and weight are reduced, while nevertheless every aberration is well corrected. Thus, zoom lenses having an F-number of 1.6 with a zoom ratio of 3 covering at least a 40° angular field are obtained in the wide angle position. It is noted, in connection with the following embodiments, that provision of a cemented surface in the 1st and 2nd lens components aims at good correction of chromatic aberration produced in these lens components. The position of the aspheric surfaces, provided in the above-described 1st lens component and 2nd lens component may be located anywhere to effect the same result according to of the aberration theory. However, as will be described later, it is preferred to provide the aspheric surface at the rearmost surface in the 1st lens component and at the rear surface of the frontmost negative lens element in the 2nd lens component. The positioning of the aspheric surfaces at such locations makes it possible to lessen the aspheric quantity, and to further facilitate correction of distortion in the wide angle positions.

Use is also made of an aspheric surface in the 3rd component to correct for the spherical aberration produced mainly by strengthening the power of the 3rd lens component. An appropriate correcting condition therefor is as follows:

$$-1.66 < \Psi_3 < -0.87 \tag{VI}$$

where $\Psi_3$: the sum of 3rd order aspheric coefficients provided in the 3rd lens component.

To prevent deterioration of the off-axis aberrations and correct spherical aberration, it is desired that the surface in which the aspherical surface is used satisfy the following conditions:

$$1.45 < h/fw \tag{VII}$$

$$0.13 \geq |\overline{h}|/fw \tag{VIII}$$

where h and $\overline{h}$ are the previously noted quantities used in ray tracing.

The condition (VII) inequality and the condition (VIII) inequality mean may be otherwise stated. The aspheric surface provided in the 3rd lens component is preferably positioned adjacent to a stop provided in the 3rd lens component.

It should be pointed out that the aspheric surfaces, which are used in the present invention may be manufactured in the form of a thin layer of high molecular substance applied on the spherical surface of glass. The aspherical surface by such a production technique has the following merits:

(i) In comparison with the generally accepted glassy aspheric surface production technique, there is the possibility of reducing the production cost.

(ii) In comparison with the pure plastic lens, the influence of temperature and humidity is less on the form and the refractive index; and (iii) The radius of curvature of the interface between the thin layer and the glass lens and the radius of curvature of the base of the thin layer aspheric surface are differentiated from each other so that the thin layer portion is positively acted as a lens, thereby giving an additional advantage that aberration correction is further facilitated as it not only functions as the aspheric surface but also serves as a thin layer lens.

Figure 3B:
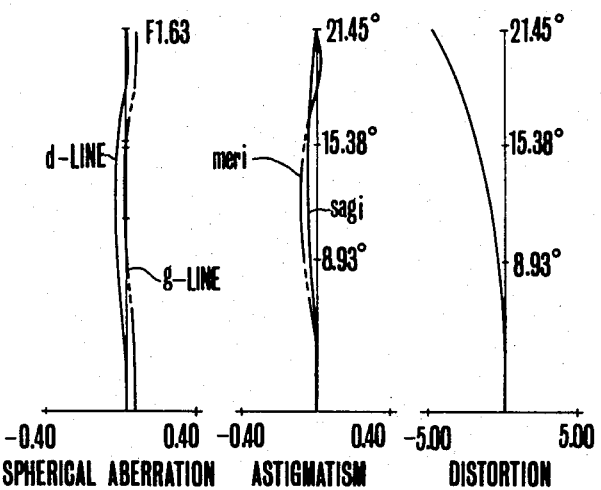
FIGS. 3(B), (C) and (D) are graphic representations of the various aberrations of the zoom lens of FIG. 3(A) in the wide angle, middle and telephoto positions respectively.
Figure 3C:
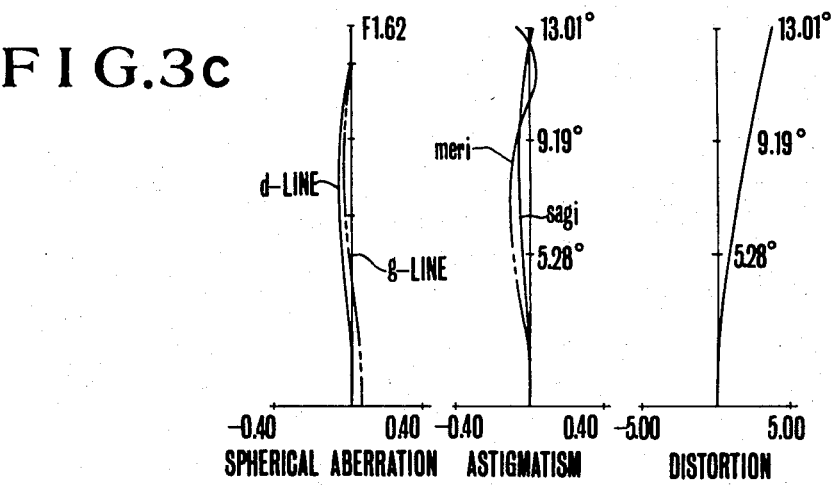
FIG. 3(A) is a longitudinal, sectional view of one embodiment of a zoom lens, according to the present invention.
Figure 3D:
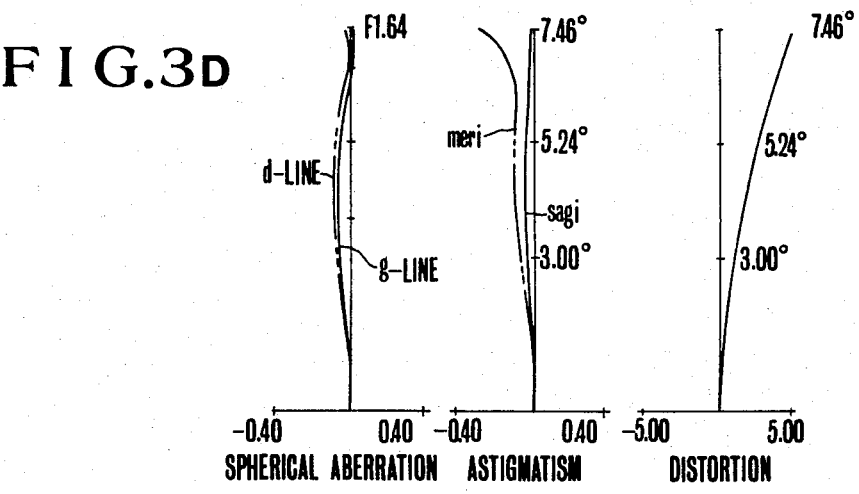
Figure 4A:
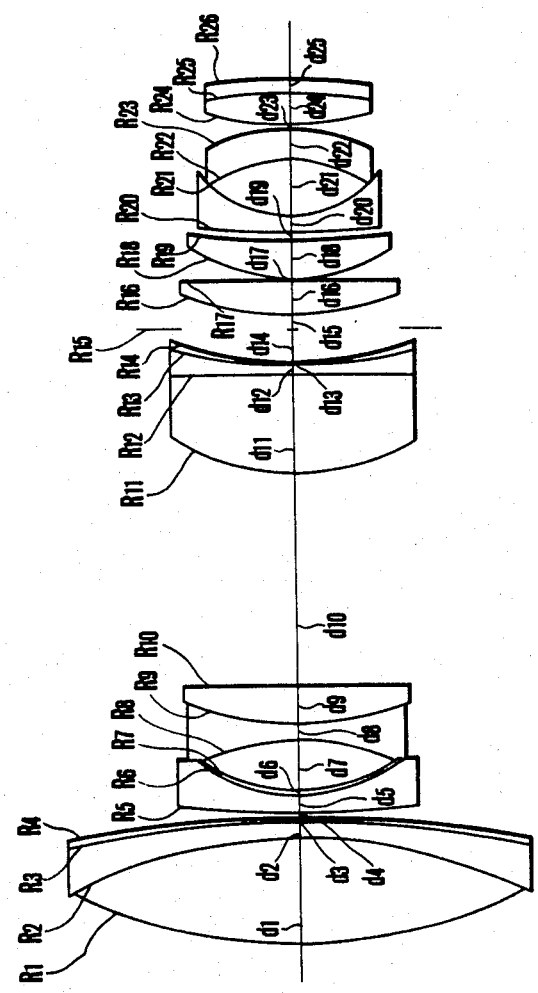
FIG. 4(A) is a longitudinal, sectional view of another embodiment of a zoom lens according to the present invention.
Figure 4B:
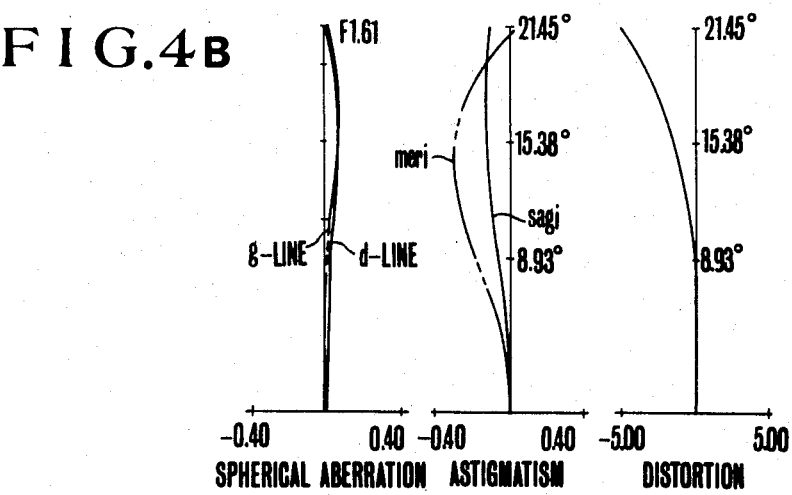
FIGS. 4(B), (C) and (D) are graphic representations of the various aberrations of the zoom lens of FIG. 4(A) in the wide angle, middle and telephoto positions respectively.
Figure 4C:
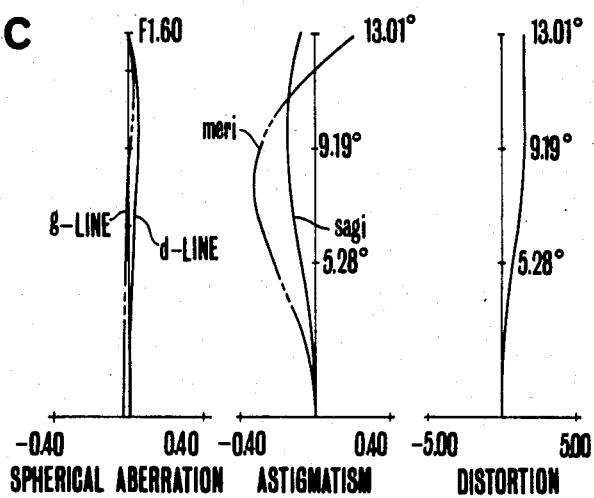
Figure 4D:
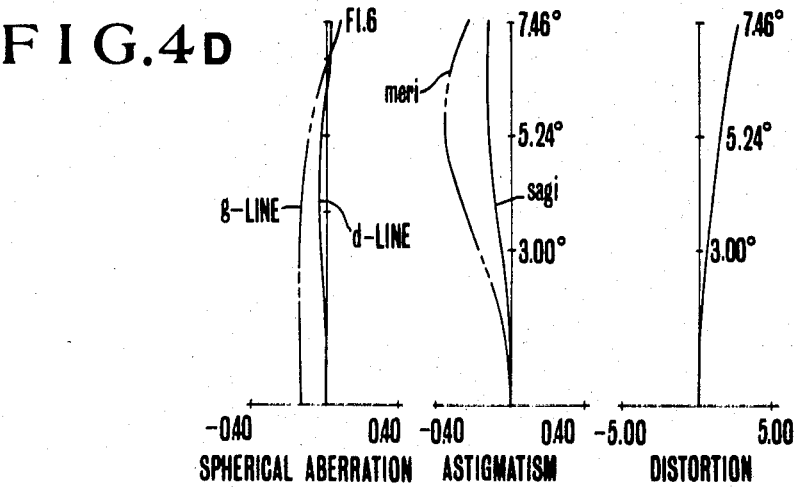
Figure 5A:
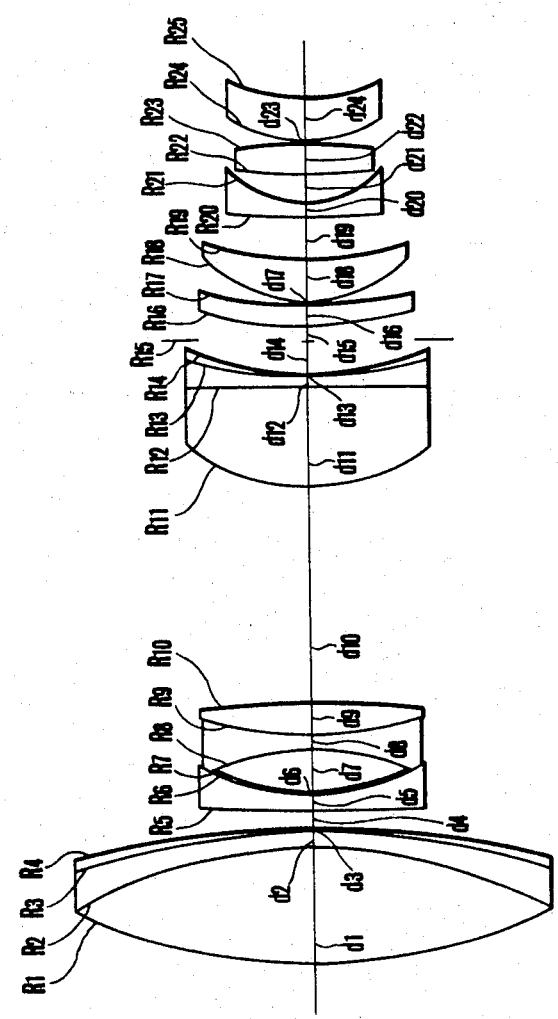
FIG. 5(A) is a longitudinal sectional view of still another embodiment of a zoom lens according to the present invention.
Figure 5B:
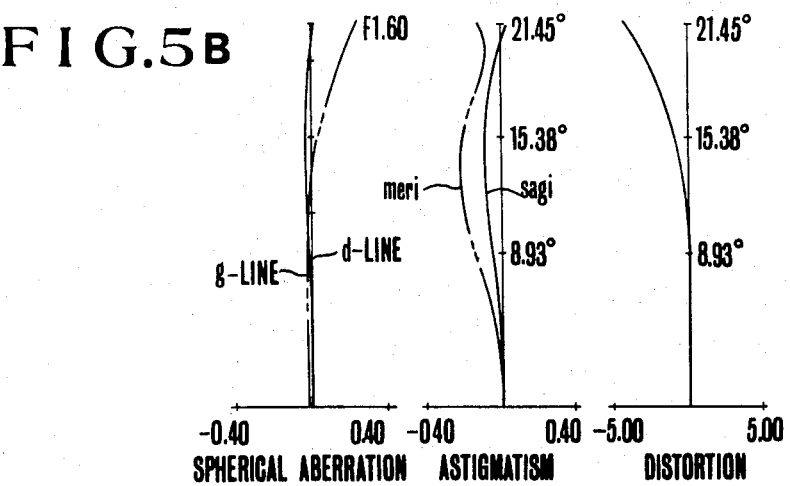
FIGS. 5(B), (C) and (D) are graphic representations of the various aberrations of the zoom lens of FIG. 5(A) in the wide angle, middle and telephoto positions respectively.
Figure 5C:
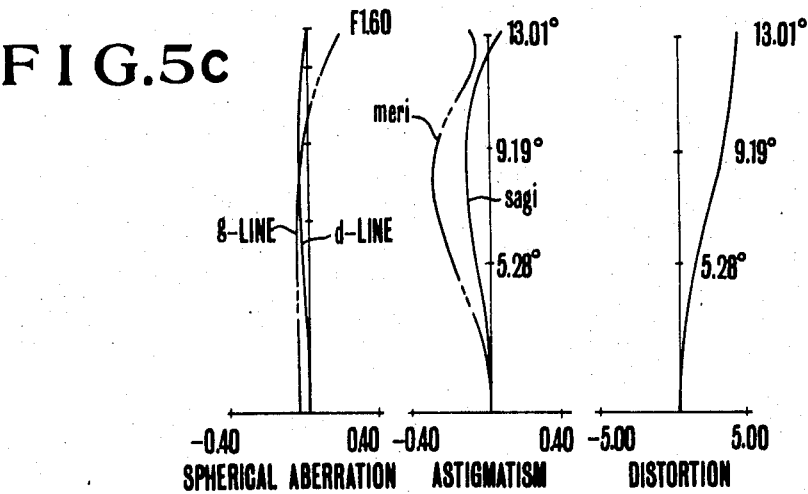
Figure 5D:
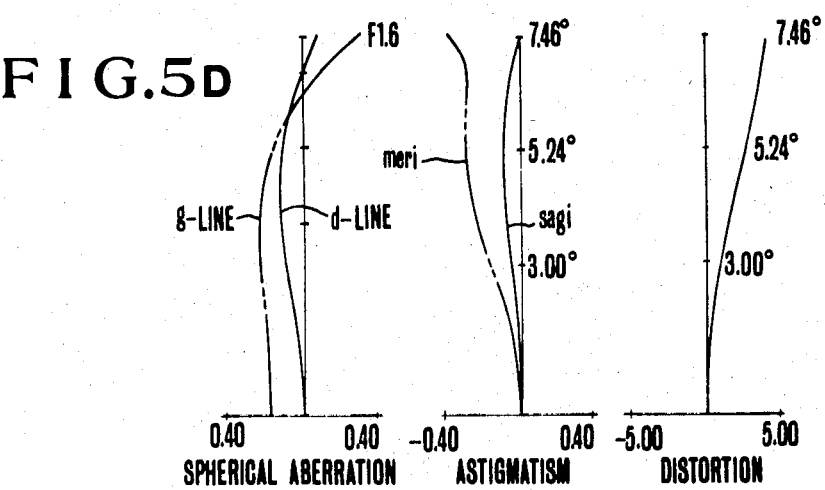
Figure 6A:
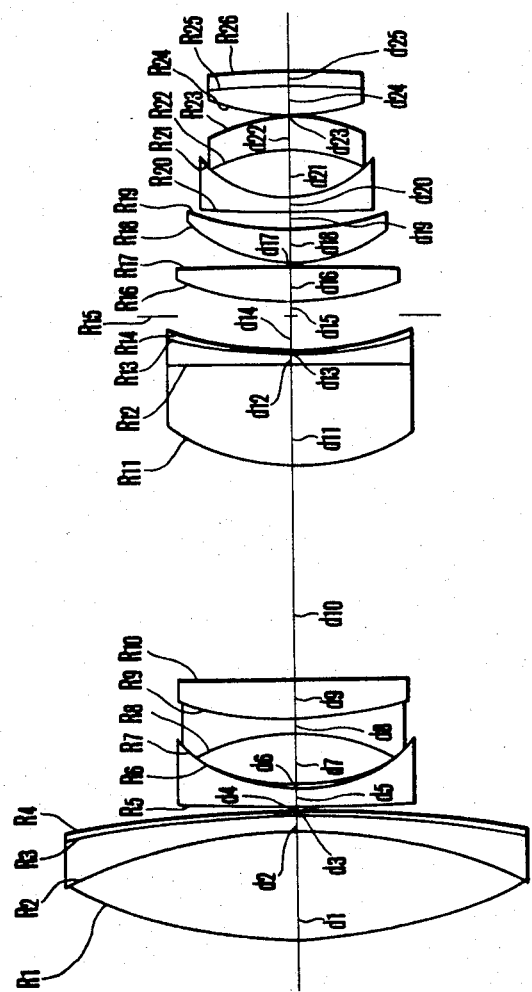
FIG. 6(A) is a longitudinal sectional view of a further embodiment of a zoom lens according to the present invention.
Figure 6B:
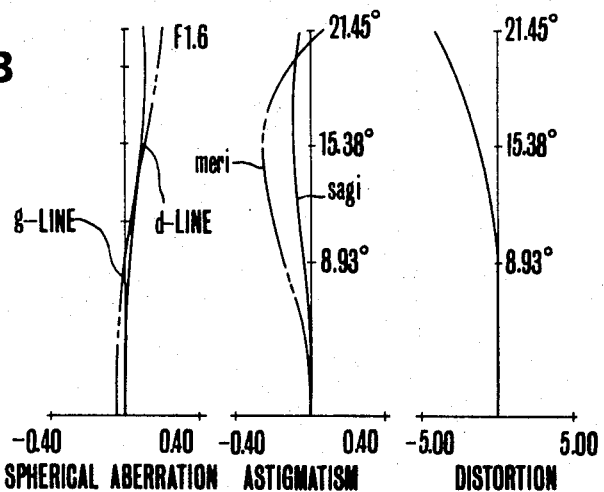
FIGS. 6(B), (C) and (D) are graphic representations of the various aberrations of the zoom lens of FIG. 6(A)
Figure 6C:
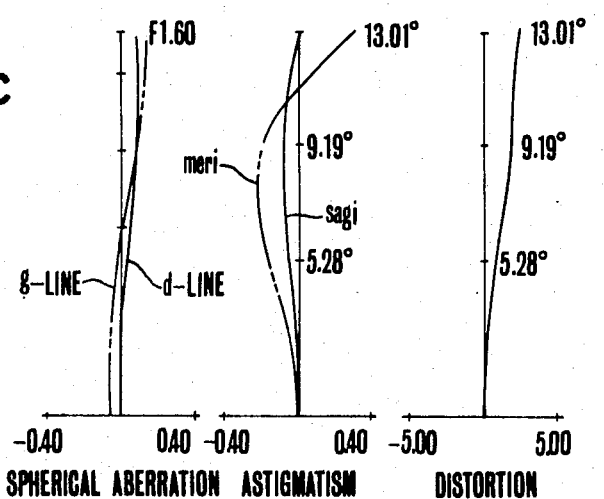
Figure 6D:
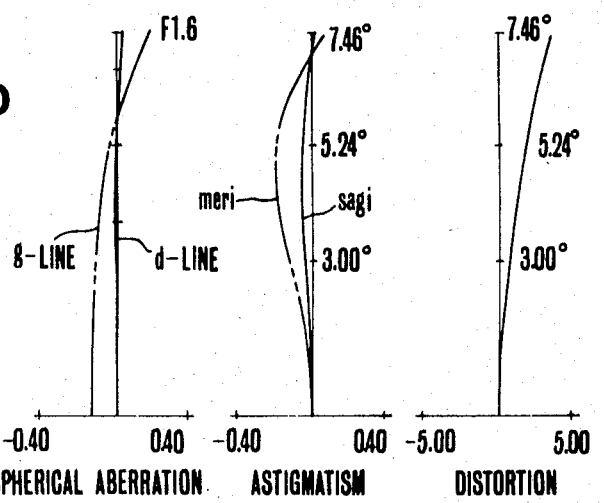
Figure 7C:
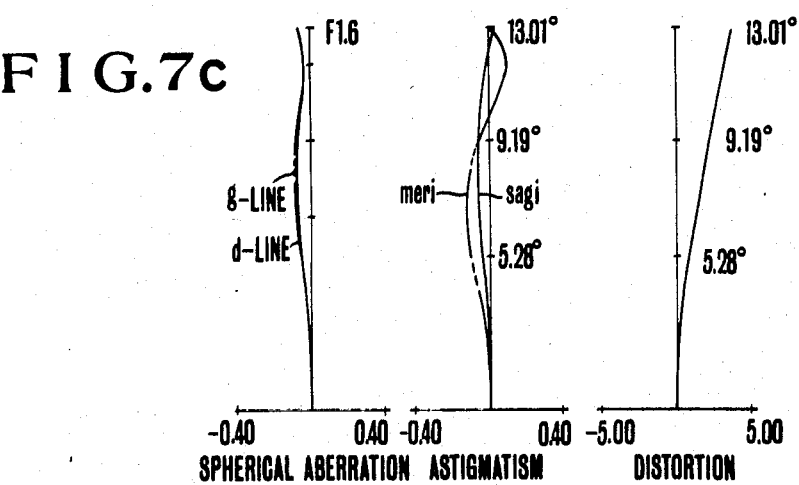
Figure 7D:
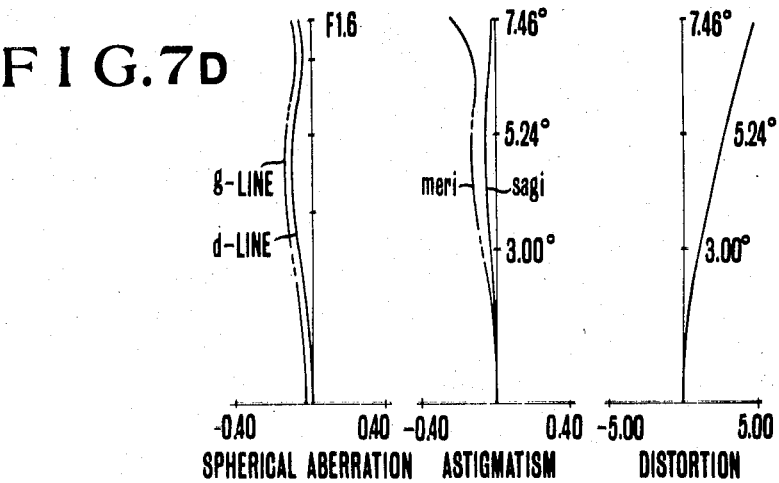

In the following, embodiments of the invention are shown. FIG. 3(A) is a lens block diagram of embodiment 1, and FIG. 3(B), FIG. 3(C) and FIG. 3(D) each show the aberrations of embodiment 1 with the object at infinity and (B) representing the wide angle position, (C) the middle position, and (D) the telephoto position. FIG. 4(A) is a lens block diagram of embodiment 2, and FIG. 4(B), FIG. 4(C) and FIG. 4(D) each show the aberrations of embodiment 2 with the object at infinity with (B) representing the wide angle position, (C) the middle position and (D) the telephoto position. FIG. 5(A) is a lens block diagram of embodiment 3, and FIG. 5(B), FIG. 5(C) and FIG. 5(D) each show the aberrations of embodiment 3 with object at infinity with the (B) representing the wide angle position, (C) the middle position and (D) the telephoto position. FIG. 6(A) is a lens block diagram of embodiment 4 and FIG. 6(B), FIG. 6(C) and FIG. 6(D) each show the aberrations of the embodiment 4 with the object at infinity with (B) representing the wide angle position, (C) the middle position and (D) the telephoto position. FIG. 7(A) is a lens block diagram of embodiment 5, and FIG. 7(B), FIG. 7(C) and FIG. 7(D) each show the aberrations of embodiment 5 with object at infinity with the (B) representing the wide angle position, (C) the middle position and (D) the telephoto position.

Embodiment 1
f: 14.00–42.00, F1.6, 2ω: 42.9° – 14.9°

| Surface No. | R | d | $n_d$ | $v_d$ |
|---|---|---|---|---|
| 1 | 35.995 | 7.50 | 1.65160 | 58.6 |
| 2 | −38.080 | 1.10 | 1.84666 | 23.9 |
| 3 | −83.906 | 0.21 | 1.55000 | 35.4 |
| 4 | −64.422 | Variable | 1. | |
| 5 | 554.895 | 0.90 | 1.77250 | 49.6 |
| 6 | 16.443 | 0.15 | 1.55000 | 35.4 |
| 7 | 14.022 | 3.00 | 1. | |
| 8 | −15.880 | 0.90 | 1.83400 | 37.2 |
| 9 | 15.133 | 3.10 | 1.84666 | 23.9 |
| 10 | −38.761 | Variable | 1. | |
| 11 | 14.451 | 6.30 | 1.67790 | 55.3 |
| 12 | ∞ | 0.70 | 1.80518 | 25.4 |
| 13 | 23.866 | 0.10 | 1.55000 | 35.4 |
| 14 | 34.188 | 2.10 | 1. | |
| 15 | ∞ | 1.00 | 1. | |
| 16 | 19.470 | 2.31 | 1.77250 | 49.6 |
| 17 | 161.220 | 0.20 | 1. | |
| 18 | 12.732 | 2.41 | 1.77250 | 49.6 |
| 19 | 101.080 | 1.34 | 1. | |
| 20 | 23.965 | 1.00 | 1.80518 | 25.4 |
| 21 | 6.322 | 2.39 | 1. | |
| 22 | 66.027 | 1.00 | 1.83400 | 37.2 |
| 23 | 14.141 | 0.42 | 1. | |
| 24 | 11.452 | 2.11 | 1.80610 | 40.9 |
| 25 | −54.035 | 1.00 | 1. | |
| 26 | ∞ | 5.50 | 1.51633 | 64.1 |
| 27 | ∞ | | 1. | |

| | f = 14.00 | f = 23.80 | f = 42.00 |
|---|---|---|---|
| $d_4$ | 1.0813 | 10.4363 | 16.2275 |
| $d_{10}$ | 14.1973 | 9.4436 | 0.6152 |

| Coefficient Surface No. | A | B | C | D | E |
|---|---|---|---|---|---|
| 4 | 0. | $6.6604 \times 10^{-6}$ | $-6.9316 \times 10^{-9}$ | 0. | 0. |
| 7 | 0. | $-3.6866 \times 10^{-5}$ | $1.5269 \times 10^{-8}$ | 0. | 0. |
| 14 | 0. | $1.3721 \times 10^{-4}$ | $5.7910 \times 10^{-7}$ | 0. | 0. |

| | Focal Length | 3rd Order Aspheric Coefficient $\psi v$ | 5th Order Aspheric Coefficient $\psi v$ |
|---|---|---|---|
| 1st Lens Component | 41.040 | −0.0804 | 0.0984 |
| 2nd Lens Component | −12.421 | 0.4459 | −0.2168 |
| 3rd Lens Component | 16.653 | −1.6569 | −8.2224 |

Embodiment 2
f: 14.00–42.00, F1.6, 2ω = 42.9° – 14.9°

| Surface No. | R | d | $n_d$ | $v_d$ |
|---|---|---|---|---|
| 1 | 34.537 | 7.00 | 1.65160 | 58.6 |
| 2 | −35.083 | 1.10 | 1.80518 | 25.4 |
| 3 | −78.118 | 0.20 | 1.55000 | 35.4 |
| 4 | −78.118 | Variable | 1. | |
| 5 | 86.978 | 0.95 | 1.58913 | 61.1 |
| 6 | 11.027 | 0.20 | 1.55000 | 35.4 |
| 7 | 11.027 | 3.71 | 1. | |
| 8 | −15.006 | 0.95 | 1.60311 | 60.7 |
| 9 | 22.170 | 2.55 | 1.80518 | 25.4 |
| 10 | −639.084 | Variable | 1. | |
| 11 | 15.316 | 6.40 | 1.67790 | 55.3 |
| 12 | ∞ | 0.70 | 1.75520 | 27.5 |
| 13 | 35.412 | 0.20 | 1.55000 | 35.4 |
| 14 | 35.412 | 2.10 | 1. | |
| 15 | ∞ | 1.00 | 1. | |
| 16 | 22.245 | 2.06 | 1.77250 | 49.6 |
| 17 | 272.449 | 0.20 | 1. | |
| 18 | 12.239 | 2.45 | 1.77250 | 49.6 |
| 19 | 44.295 | 0.58 | 1. | |
| 20 | 56.207 | 1.00 | 1.80518 | 25.4 |
| 21 | 7.896 | 8.75 | 1. | |
| 22 | −9.611 | 2.13 | 1.77250 | 49.6 |
| 23 | −11.774 | 0.20 | 1. | |
| 24 | 20.943 | 2.13 | 1.77250 | 49.6 |
| 25 | −30.546 | 0.90 | 1.80518 | 25.4 |
| 26 | −37.331 | 2. | 1. | |
| 27 | | | 1. | |

| | f = 14.0 | f = 23.8 | f = 42.0 |
|---|---|---|---|
| $d_4$ | 0.3756 | 9.7145 | 15.4956 |
| $d_{10}$ | 13.8926 | 9.1316 | 0.2897 |

| Coefficient Surface No. | A | B | C | D | E |
|---|---|---|---|---|---|
| 4 | 0. | $5.7262 \times 10^{-6}$ | $-6.3150 \times 10^{-9}$ | 0. | 0. |
| 7 | 0. | $-4.3571 \times 10^{-5}$ | $-5.3616 \times 10^{-8}$ | 0. | 0. |
| 14 | 0. | $8.2942 \times 10^{-5}$ | $1.2728 \times 10^{-7}$ | 0. | 0. |

| | Focal Length | 3rd Order Aspheric Coefficient $\psi v$ | 5th Order Aspheric Coefficient $\Omega v$ |
|---|---|---|---|
| 1st Lens Component | 41.300 | −0.0691 | 0.0897 |
| 2nd Lens Component | −12.400 | 0.5260 | 0.7548 |
| 3rd Lens Component | 19.731 | −1.0014 | −1.8072 |

Embodiment 3
f: 14.00–42.00, F1.6, 2ω = 42.9° – 14.9°

| Surface No. | R | d | $n_d$ | $v_d$ |
|---|---|---|---|---|
| 1 | 36.369 | 7.70 | 1.60311 | 60.7 |
| 2 | −34.454 | 1.10 | 1.80518 | 25.4 |

-continued

Embodiment 3
f: 14.00–42.00, F1.6, 2ω = 42.9° – 14.9°

| Surface No. | R | d | $n_d$ | $\nu_d$ |
|---|---|---|---|---|
| 3 | −56.378 | 0.20 | 1.55000 | 35.4 |
| 4 | −56.378 | Variable | 1. | |
| 5 | 136.612 | 0.95 | 1.77250 | 49.6 |
| 6 | 13.859 | 0.20 | 1.55000 | 35.4 |
| 7 | 13.859 | 3.00 | 1. | |
| 8 | −16.081 | 0.95 | 1.67790 | 55.3 |
| 9 | 25.989 | 2.00 | 1.80518 | 25.4 |
| 10 | −87.934 | Variable | 1. | |
| 11 | 14.184 | 6.40 | 1.67790 | 55.3 |
| 12 | ∞ | 0.70 | 1.75520 | 27.5 |
| 13 | 33.558 | 0.20 | 1.55000 | 35.4 |
| 14 | 33.558 | 2.10 | 1. | |
| 15 | ∞ | 1.00 | 1. | |
| 16 | 25.026 | 1.36 | 1.77250 | 49.6 |
| 17 | 33.089 | 0.20 | 1. | |
| 18 | 9.493 | 2.80 | 1.77250 | 49.6 |
| 19 | 21.496 | 2.70 | 1. | |
| 20 | 50.493 | 1.00 | 1.84666 | 23.9 |
| 21 | 7.127 | 1.79 | 1. | |
| 22 | 28.822 | 2.13 | 1.77250 | 49.6 |
| 23 | −33.548 | 0.20 | 1. | |
| 24 | 9.128 | 2.80 | 1.77250 | 49.6 |
| 25 | 12.628 | | 1. | |
| 26 | | | 1. | |
| 27 | | | | |

| | f = 14.0 | f = 23.8 | f = 42.0 |
|---|---|---|---|
| $d_4$ | 1.0615 | 10.4003 | 16.1815 |
| $d_{10}$ | 14.1372 | 9.3762 | 0.5343 |

| Coefficient Surface No. | A | B | C | D | E |
|---|---|---|---|---|---|
| 4 | 0. | $7.6578 \times 10^{-6}$ | $-7.4899 \times 10^{-9}$ | 0. | 0. |
| 7 | 0. | $-4.3082 \times 10^{-5}$ | $2.0589 \times 10^{-7}$ | 0. | 0. |
| 14 | 0. | $1.0318 \times 10^{-4}$ | $3.5192 \times 10^{-7}$ | 0. | 0. |

| | Focal Length | 3rd Order Aspheric Coefficient $\psi\nu$ | 5th Order Aspheric Coefficient $\Omega\nu$ |
|---|---|---|---|
| 1st Lens Component | 41.300 | −0.0925 | 0.1063 |
| 2nd Lens Component | −12.420 | 0.5202 | 2.923 |
| 3rd Lens Component | 16.370 | −1.2457 | −4.997 |

Embodiment 4
f: 14.00–42.00, F1.6, 2ω = 42.9° – 14.9°

| Surface No. | R | d | $n_d$ | $\nu_d$ |
|---|---|---|---|---|
| 1 | 33.605 | 7.00 | 1.65160 | 58.6 |
| 2 | −37.417 | 1.10 | 1.80518 | 25.4 |
| 3 | −84.986 | 0.20 | 1.55000 | 35.4 |
| 4 | −84.986 | Variable | 1. | |
| 5 | 232.307 | 0.95 | 1.58913 | 61.1 |
| 6 | 11.166 | 0.20 | 1.55000 | 35.4 |
| 7 | 11.166 | 3.71 | 1. | |
| 8 | −14.707 | 0.95 | 1.51633 | 64.1 |
| 9 | 26.337 | 2.55 | 1.80518 | 25.4 |
| 10 | 454.289 | Variable | 1. | |
| 11 | 15.673 | 6.40 | 1.67790 | 55.3 |
| 12 | ∞ | 0.70 | 1.75520 | 27.5 |
| 13 | 33.906 | 0.20 | 1.55000 | 35.4 |
| 14 | 33.906 | 2.10 | 1. | |
| 15 | ∞ | 1.00 | 1. | |
| 16 | 22.363 | 2.27 | 1.77250 | 49.6 |
| 17 | −162.335 | 0.20 | 1. | |
| 18 | 10.637 | 2.40 | 1.77250 | 49.6 |
| 19 | 21.095 | 1.03 | 1. | |
| 20 | 81.335 | 1.00 | 1.80518 | 25.4 |
| 21 | 7.977 | 3.20 | 1. | |
| 22 | −11.541 | 2.13 | 1.77250 | 49.6 |
| 23 | −12.572 | 0.20 | 1. | |
| 24 | 20.380 | 1.80 | 1.77250 | 49.6 |
| 25 | −46.017 | 0.90 | 1.80518 | 25.4 |
| 26 | −55.834 | | 1. | |
| 27 | | | 1. | |

| | f = 14.00 | f = 23.80 | f = 42.00 |
|---|---|---|---|
| $d_4$ | 0.4211 | 9.7599 | 15.5411 |
| $d_{10}$ | 14.1436 | 9.3826 | 0.5408 |

| Coefficient Surface No. | A | B | C | D | E |
|---|---|---|---|---|---|
| 4 | 0. | $5.7780 \times 10^{-6}$ | $-6.4871 \times 10^{-9}$ | 0. | 0. |
| 7 | 0. | $-4.9441 \times 10^{-5}$ | $-1.9997 \times 10^{-7}$ | 0. | 0. |
| 14 | 0. | $7.2370 \times 10^{-5}$ | $6.9633 \times 10^{-8}$ | 0. | 0. |

| | Focal Length | 3rd Order Aspheric Coefficient $\psi\nu$ | 5th Order Aspheric Coefficient $\Omega\nu$ |
|---|---|---|---|
| 1st Lens Component | 41.300 | −0.0698 | 0.0921 |
| 2nd Lens Component | −12.420 | 0.5969 | 2.8393 |
| 3rd Lens Component | 19.002 | −0.8738 | −0.9887 |

Embodiment 5
f: 14.00–42.00, F1.6, 2ω = 42.9° – 14.9°

| Surface No. | R | d | $n_d$ | $\nu_d$ |
|---|---|---|---|---|
| 1 | 36.200 | 7.50 | 1.65160 | 58.6 |
| 2 | −38.448 | 1.10 | 1.84666 | 23.9 |
| 3 | −83.901 | 0.21 | 1.55000 | 35.4 |
| 4 | −64.273 | Variable | 1. | |
| 5 | 859.736 | 0.90 | 1.77250 | 49.6 |
| 6 | 16.915 | 0.15 | 1.55000 | 35.4 |
| 7 | 14.351 | 3.10 | 1. | |
| 8 | −16.132 | 0.90 | 1.83400 | 37.2 |
| 9 | 15.609 | 2.90 | 1.84666 | 23.9 |
| 10 | −40.884 | Variable | 1. | |
| 11 | 14.266 | 6.30 | 1.67790 | 55.4 |
| 12 | ∞ | 0.70 | 1.80518 | 25.4 |
| 13 | 22.441 | 0.10 | 1.55000 | 35.4 |
| 14 | 35.996 | 2.10 | 1. | |
| 15 | ∞ | 1.00 | 1. | |
| 16 | 19.344 | 2.80 | 1.77250 | 49.6 |
| 17 | 192.696 | 0.20 | 1. | |
| 18 | 12.460 | 3.18 | 1.77250 | 49.6 |
| 19 | 92.413 | 0.89 | 1. | |
| 20 | 26.314 | 1.00 | 1.80518 | 25.4 |
| 21 | 6.311 | 2.95 | 1. | |
| 22 | 37.932 | 1.00 | 1.83400 | 37.2 |
| 23 | 12.966 | 0.47 | 1. | |
| 24 | 11.143 | 2.28 | 1.80610 | 40.9 |
| 25 | −86.387 | | 1. | |
| 26 | | | 1. | |
| 27 | | | 1. | |

|  | f = 14.00 | f = 23.80 | f = 42.00 |
|---|---|---|---|
| $d_4$ | 1.0818 | 10.4206 | 16.2018 |
| $d_{10}$ | 14.2166 | 9.4556 | 0.6137 |

| Coefficient Surface No. | A | B | C | D | E |
|---|---|---|---|---|---|
| 4 | 0. | $6.5747 \times 10^{-6}$ | $-6.3596 \times 10^{-9}$ | 0. | 0. |
| 7 | 0. | $-3.6487 \times 10^{-5}$ | $4.1893 \times 10^{-9}$ | 0. | 0. |
| 14 | 0. | $1.3701 \times 10^{-4}$ | $5.7667 \times 10^{-7}$ | 0. | 0. |

|  | Focal Length | 3rd Order Aspheric Coefficient $\psi\nu$ | 5th Order Aspheric Coefficient $\psi\nu$ |
|---|---|---|---|
| 1st Lens Component | 41.100 | −0.0794 | 0.0903 |
| 2nd Lens Component | −12.420 | 0.4405 | −0.0595 |
| 3rd Lens Component | 16.657 | −1.6542 | −8.1879 |

It is noted that Ri is the radius of curvature of the i-th surface; $d_i$ is the axial thickness or axial air separation between the i-th and (i+1)th surfaces; $n_d$ is the index of refraction; $\nu_d$ the Abbe number; f is the focal length of the entire system; F is the F-number; and $2\omega$ is the angular field.

What is claimed is:

1. A zoom lens consisting of, from front to rear,
   a first lens component of positive focal length having a cemented surface and at least one aspheric surface;
   a second lens component of negative focal length having at least one aspheric surface;
   a third lens component of positive focal length having at least one aspheric surface;
   said first and second lens components being moved when in zooming, said first lens component being moved when in focusing, and said third lens component being stationary when in zooming and focusing; and
   said aspheric surface provided in said first lens component being a surface having a negative third order aspheric coefficient, and said aspheric surface provided in said second lens component being a surface having a positive third order aspheric coefficient.

2. A zoom lens as described in claim 1, wherein said 2nd lens component comprises a first negative lens and a second negative lens cemented together and disposed to the rear of said 1st lens component.

3. A zoom lens as described in claim 2, where letting $\Psi_1$, $\Psi_2$, and $\Psi_3$ each denote the sum of the 3rd order aspheric coefficients provided in said 1st, said 2nd and 3rd lens components respectively, $f_w$ the shortest focal length of the entire system, $f_1$ the focal length of the 1st lens component, $f_2$ the focal length of the 2nd lens component, $f_3$ the focal length of the 3rd lens component, and l the axial separation between the 2nd and 3rd lens components at wide angle setting, $-0.093 < \Psi_1 < -0.069$ $0.44 < \Psi_2 < 0.60$ $-1.66 < \Psi_3 < -0.87$ $2.9 < f_1/f_w < 3.0$ $-0.9 < f_2/f_w < -0.85$ $1.1 < l/f_w < 1.2.$ 4. A zoom lens as described in claim 2, wherein said aspheric surface used in said 3rd lens component satisfies:

$1.45 < h/f_w$ $0.13 \geq |\overline{h}|/f_w$ wherein h and $\overline{h}$ are the paraxial light ray and the paraxial pupil light ray respectively.

5. A zoom lens as described in claim 2, wherein said 3rd lens component is provided with a stop, and said aspheric surface provided in said 3rd lens lens component is provided in a position facing said stop.

6. A zoom lens according to claim 1, wherein
   the first lens component moves from the object side to the image side; and
   the second lens component makes a convex reciprocate movement at the time of zooming from the wide angle end to the telescope end.

* * * * *